A. J. BATES.
EXPANDING MACHINE.
APPLICATION FILED FEB. 14, 1916.

1,260,857.

Patented Mar. 26, 1918.
13 SHEETS—SHEET 1.

A. J. BATES.
EXPANDING MACHINE.
APPLICATION FILED FEB. 14, 1916.

1,260,857.

Patented Mar. 26, 1918.
13 SHEETS—SHEET 4.

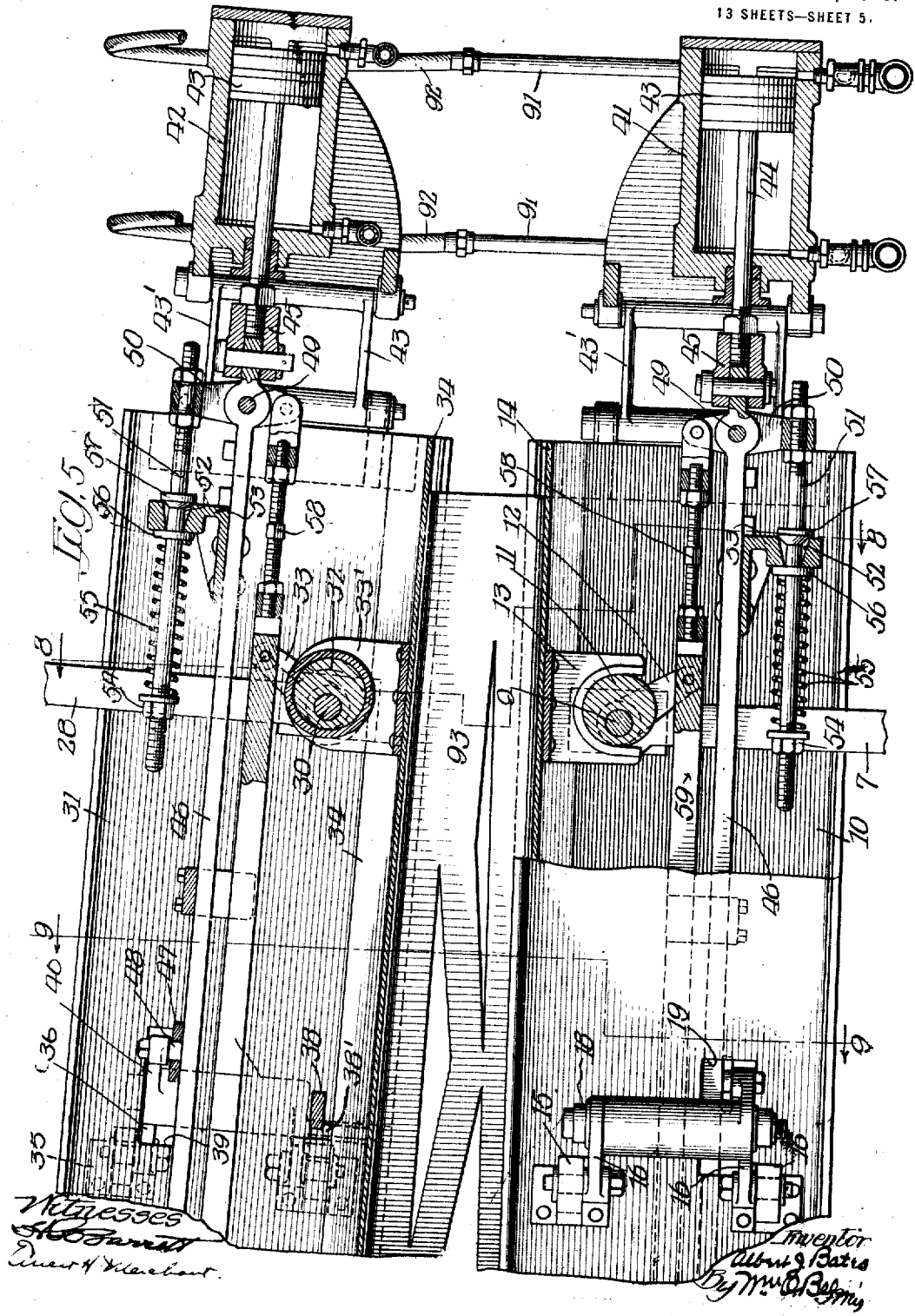

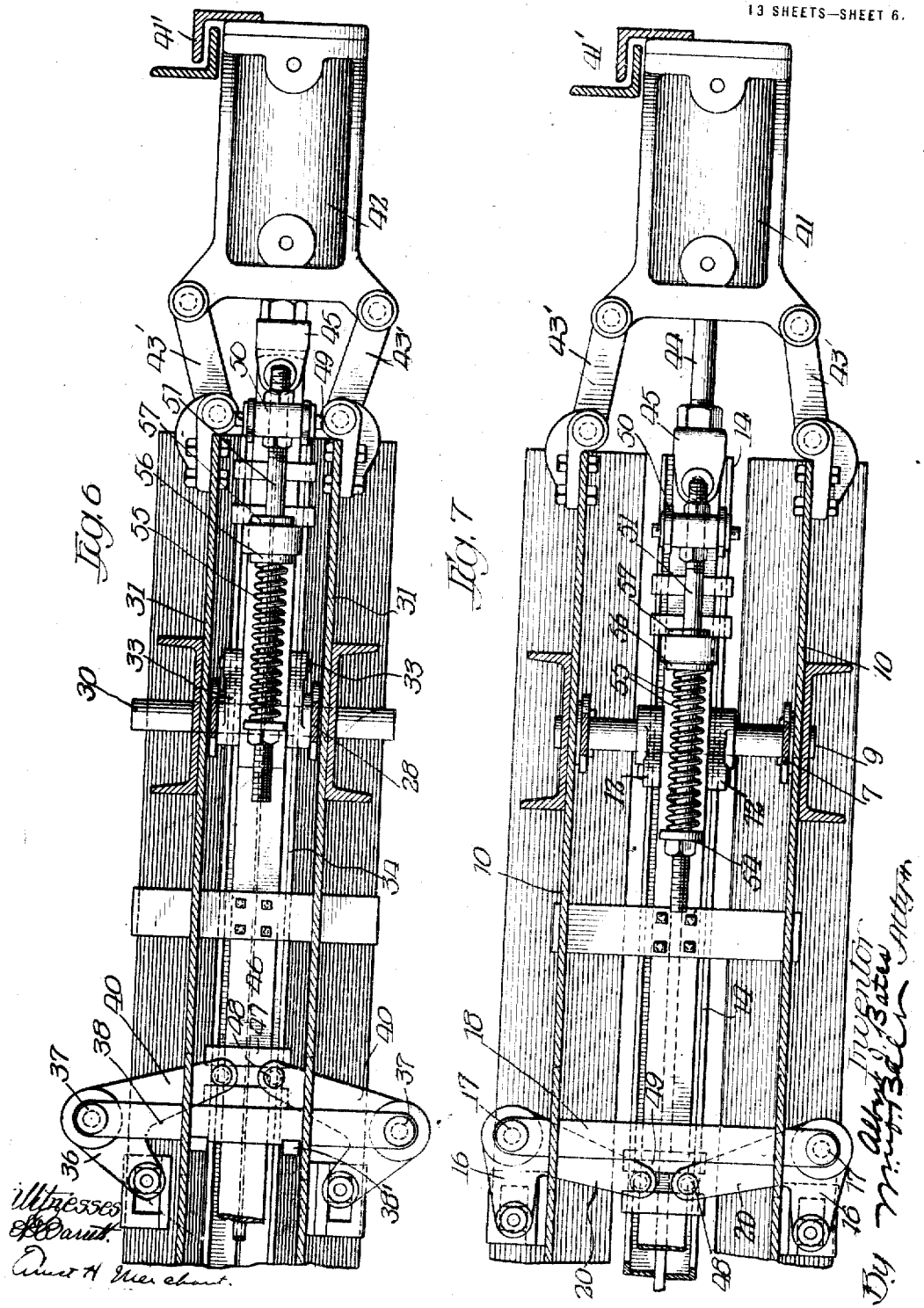

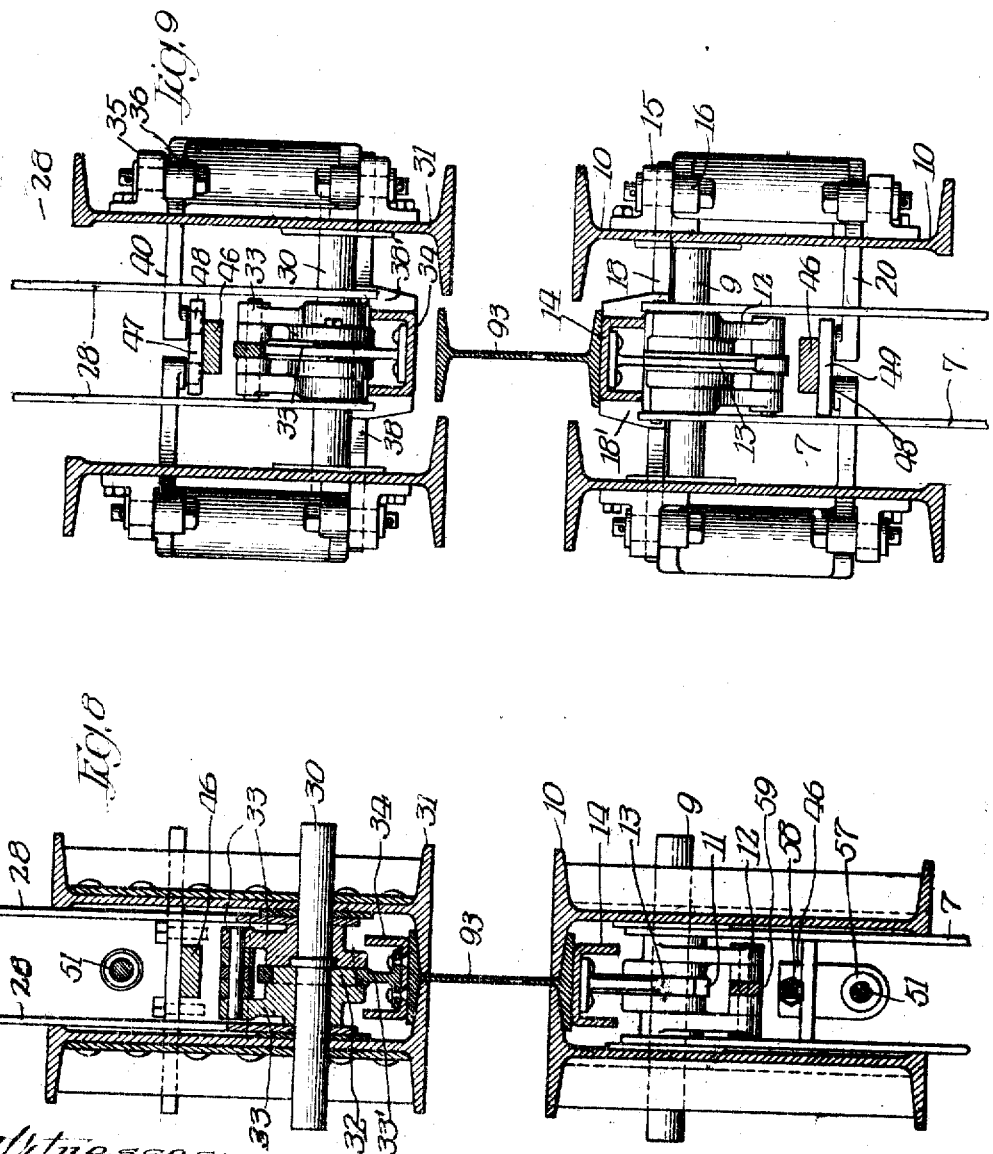

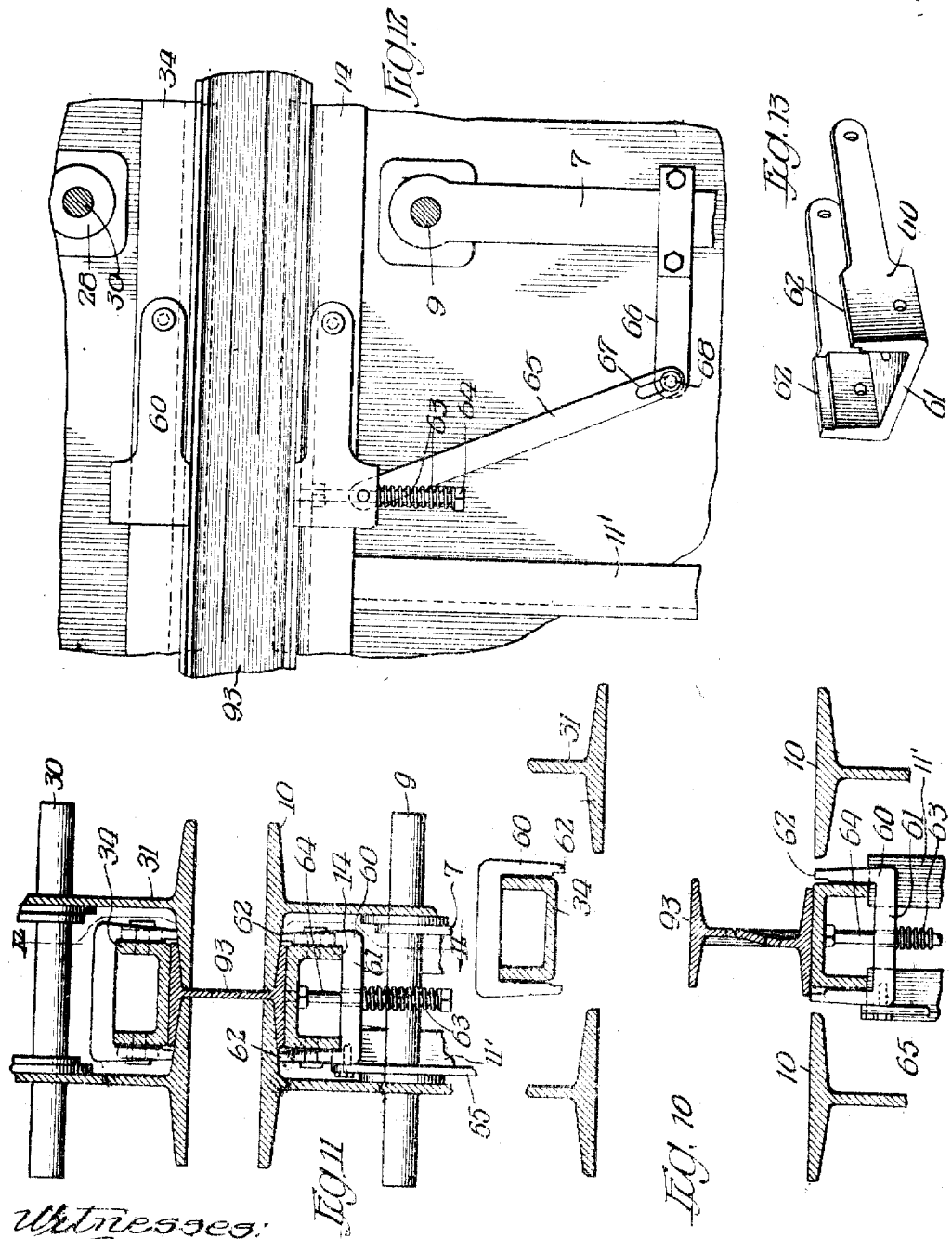

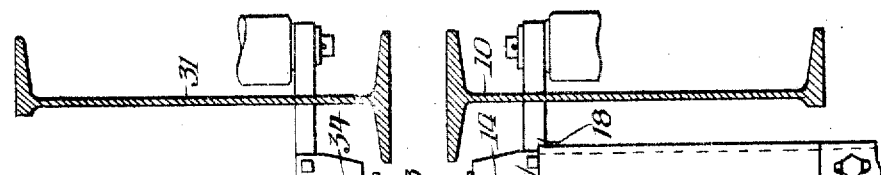
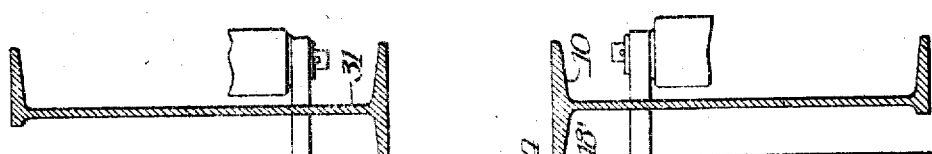

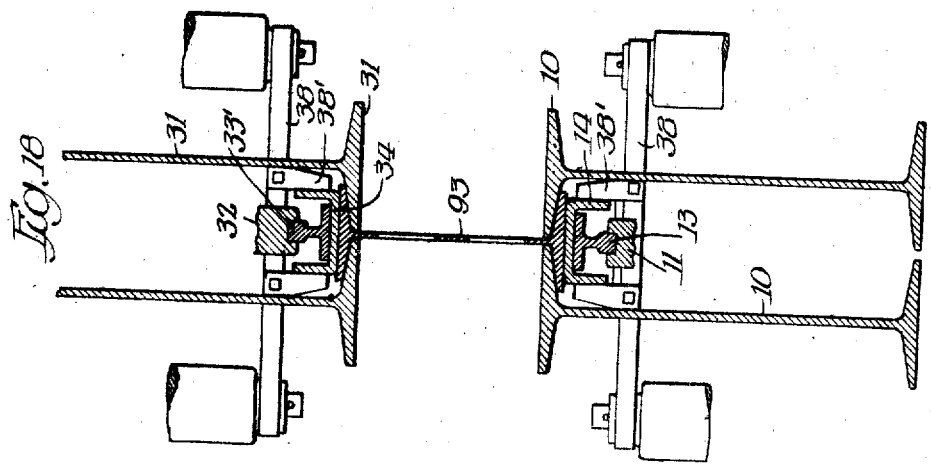
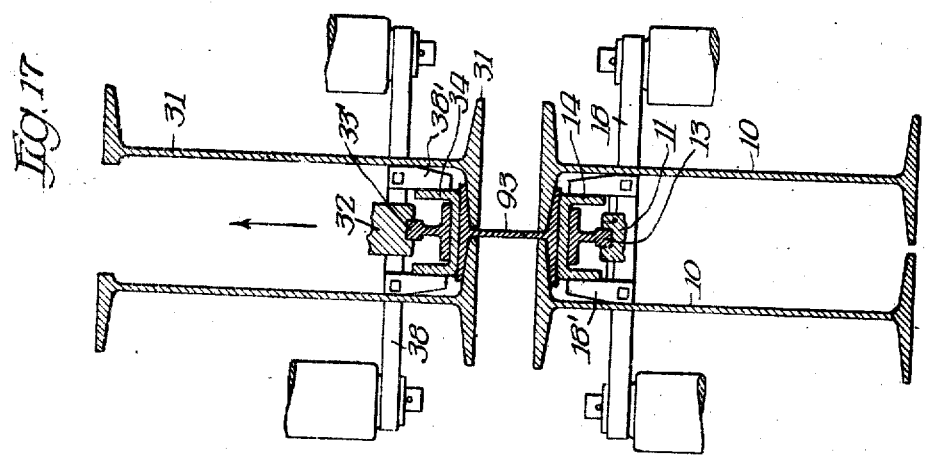

A. J. BATES.
EXPANDING MACHINE.
APPLICATION FILED FEB. 14, 1916.
1,260,857.
Patented Mar. 26, 1918.
13 SHEETS—SHEET 11.
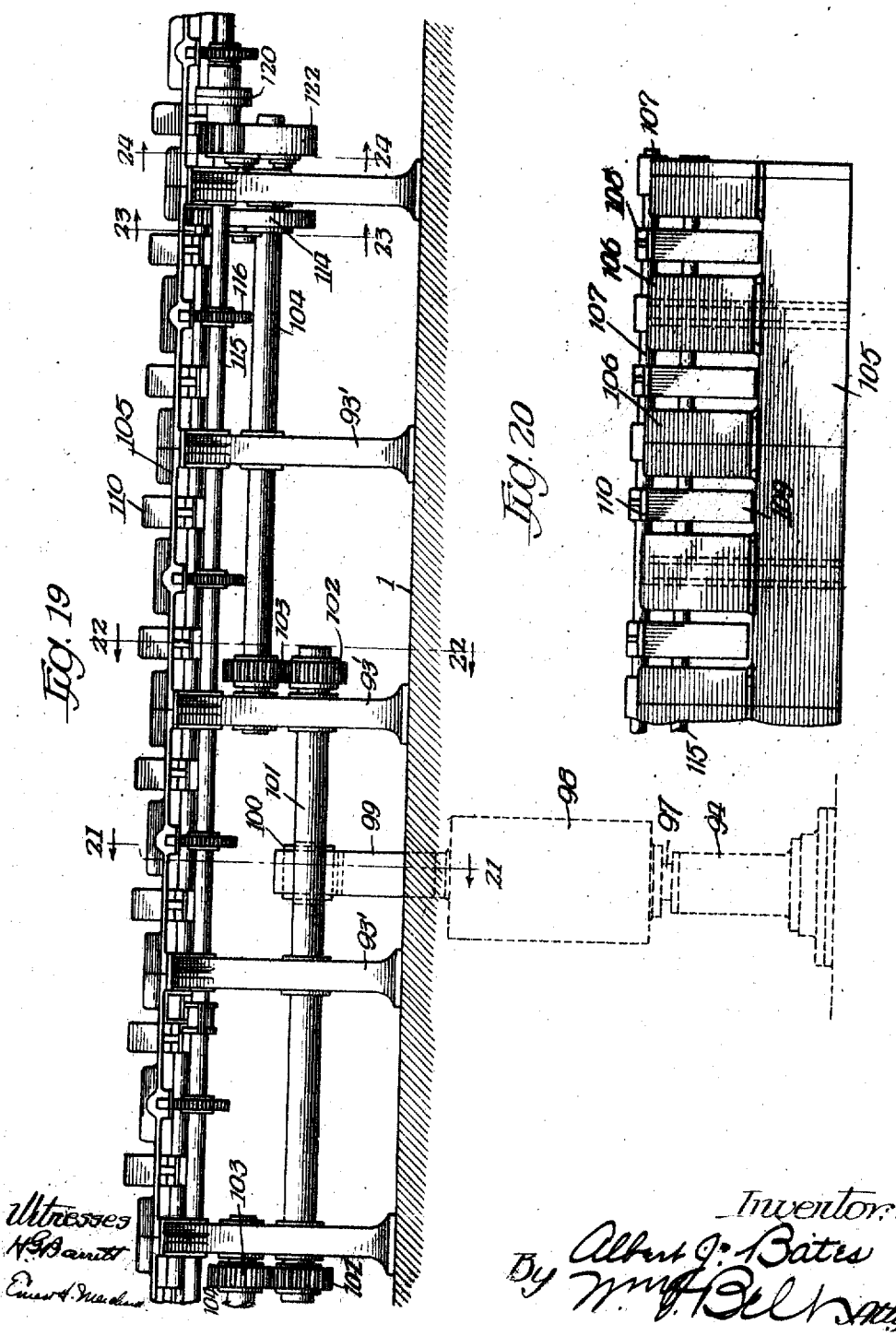

A. J. BATES.
EXPANDING MACHINE.
APPLICATION FILED FEB. 14, 1916.
1,260,857.
Patented Mar. 26, 1918.
13 SHEETS—SHEET 12.
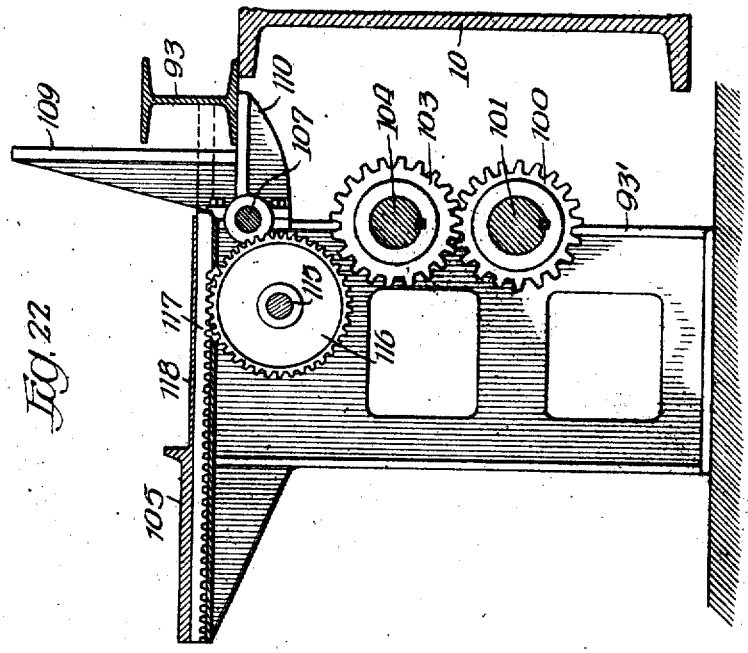
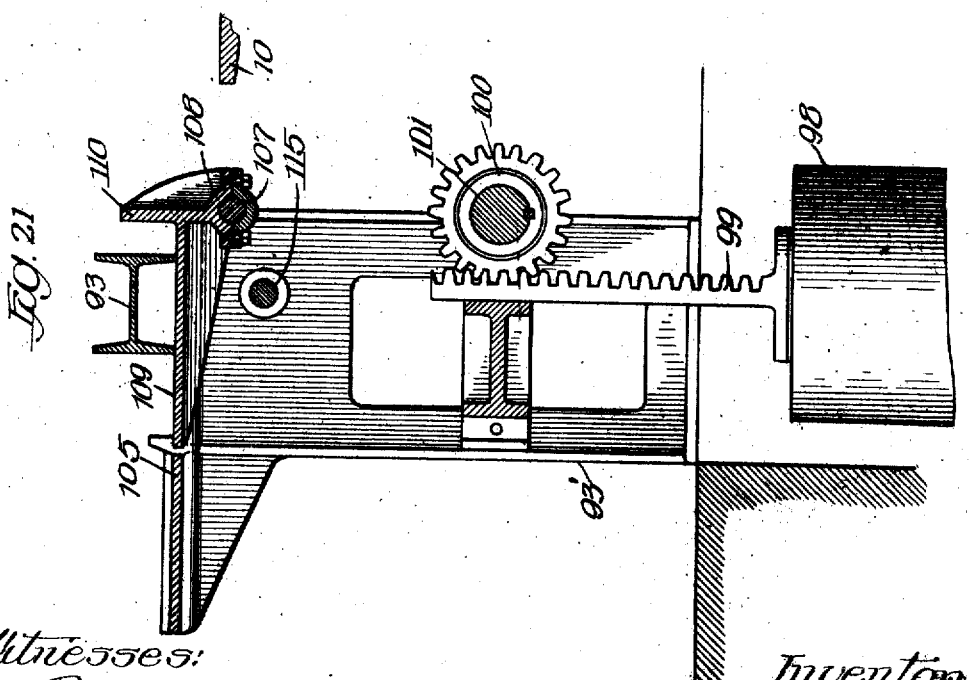

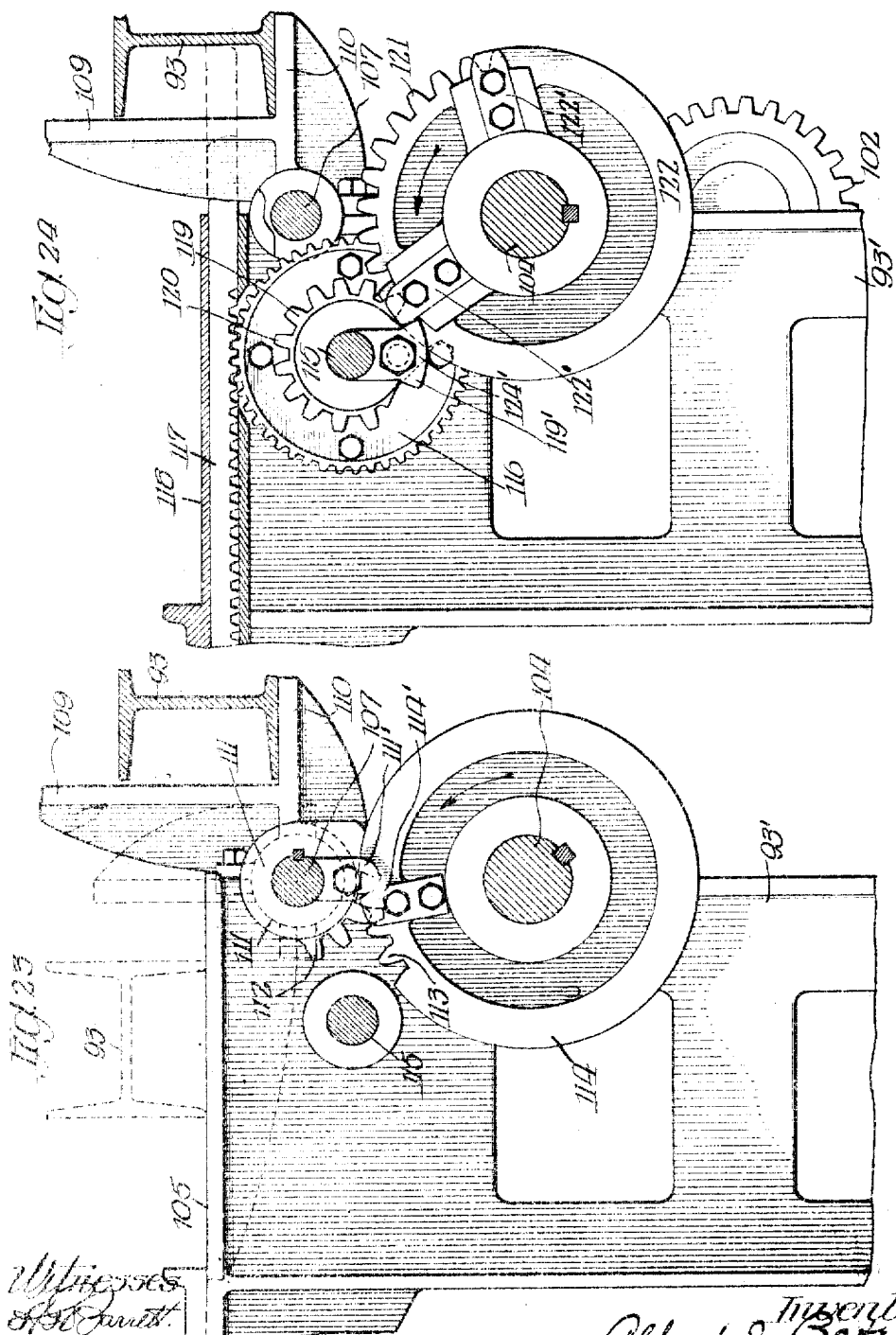

UNITED STATES PATENT OFFICE.

ALBERT J. BATES, OF CHICAGO, ILLINOIS, ASSIGNOR TO BATES EXPANDED STEEL TRUSS CO., OF WILMINGTON, DELAWARE, A CORPORATION OF DELAWARE.

EXPANDING-MACHINE.

1,260,857.  Specification of Letters Patent.  Patented Mar. 26, 1918.

Application filed February 14, 1916. Serial No. 78,198.

*To all whom it may concern:*

Be it known that I, ALBERT J. BATES, a citizen of the United States, residing at Chicago, in the county of Cook and State of Illinois, have invented certain new and useful Improvements in Expanding-Machines, of which the following is a specification.

This invention relates in general to the art of metal working and more particularly to a machine for expanding metallic members in accordance with the method described in Letters Patent No. 1,005,925, granted to me on October 17, 1911, for method of making trussed structures.

The principal object of my invention is the provision of a machine for expanding metallic members to form integral trussed structures.

A further object of my invention is the provision in a machine for expanding metallic members, of means for securely gripping the sides of the members to be expanded and for separating the gripping means to expand the members.

A further object of my invention is the provision of means whereby one end of a metallic member may be expanded to a greater degree than the other to produce a tapered trussed structure in one operation.

A further object of my invention is the provision in a machine for expanding metallic members of means for automatically straightening a warped member prior to the expanding operation.

A further object of my invention is the provision in a machine for expanding metallic members of means, whereby the expanding force is evenly distributed throughout the length of the member to be expanded, is readily controllable at will and is automatically cut off when the limit of the desired expansion is reached.

A further object of my invention is the provision of means for retaining the expanded member in its proper relative position when released from the gripping means.

A still further object of my invention is the provision of readily controllable means for delivering members to be expanded to the expanding machine.

Other objects and advantages of my invention will be apparent as it is better understood by reference to the following specification when read in connection with the accompanying drawing, illustrating the preferred embodiment thereof, in which—

Fig. 5 is an enlarged vertical section on the line 5—5 of Fig. 1;

Fig. 6 is an enlarged horizontal section on the line 6—6 of Fig. 2, illustrating gripping position of the mechanism;

Fig. 7 is an enlarged horizontal section on the line 7—7 of Fig. 2, illustrating the releasing position of the mechanism;

Fig. 8 is a vertical section on the line 8—8 of Fig. 5;

Fig. 9 is a vertical section on the line 9—9 of Fig. 5;

Fig. 10 is a vertical section illustrating the gripping means with a warped member in position to be gripped and straightened prior to the expanding operation;

Fig. 11 is a similar view illustrating the straightened member gripped and ready for the expanding operation;

Fig. 12 is a vertical section on the line 12—12 of Fig. 11;

Fig. 13 is a perspective view of the means for retaining the expanded member in proper position when the gripping members are withdrawn prior to discharging the member;

Figs. 14 to 18, inclusive, are diagrammatic views illustrating the operations of the machine;

Fig. 19 is a side elevation of a portion of the mechanism for delivering members to be expanded to the expanding machine;

Fig. 20 is a top plan view of the portion of the mechanism illustrated in Fig. 19;

Fig. 21 is an enlarged vertical section on the line 21—21 of Fig. 19;

Fig. 22 is an enlarged vertical section on the line 22—22 of Fig. 19;

Fig. 23 is an enlarged vertical section on the line 23—23 of Fig. 19, and

Fig. 24 is an enlarged vertical section on the line 24—24 of Fig. 19.

Figure 3:
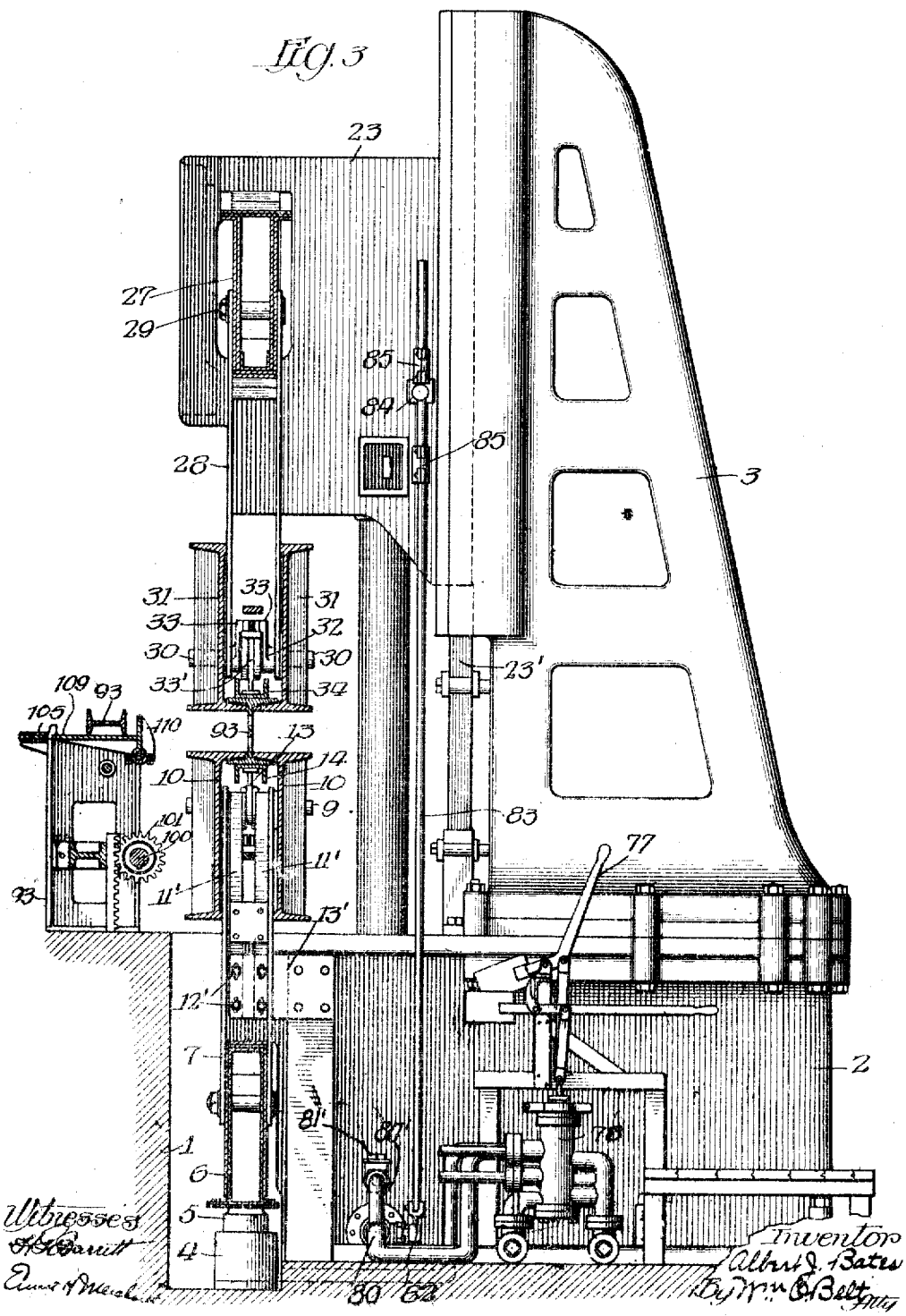
Fig. 3 is an enlarged vertical section on the line 3—3 of Fig. 2.
Figure 4:
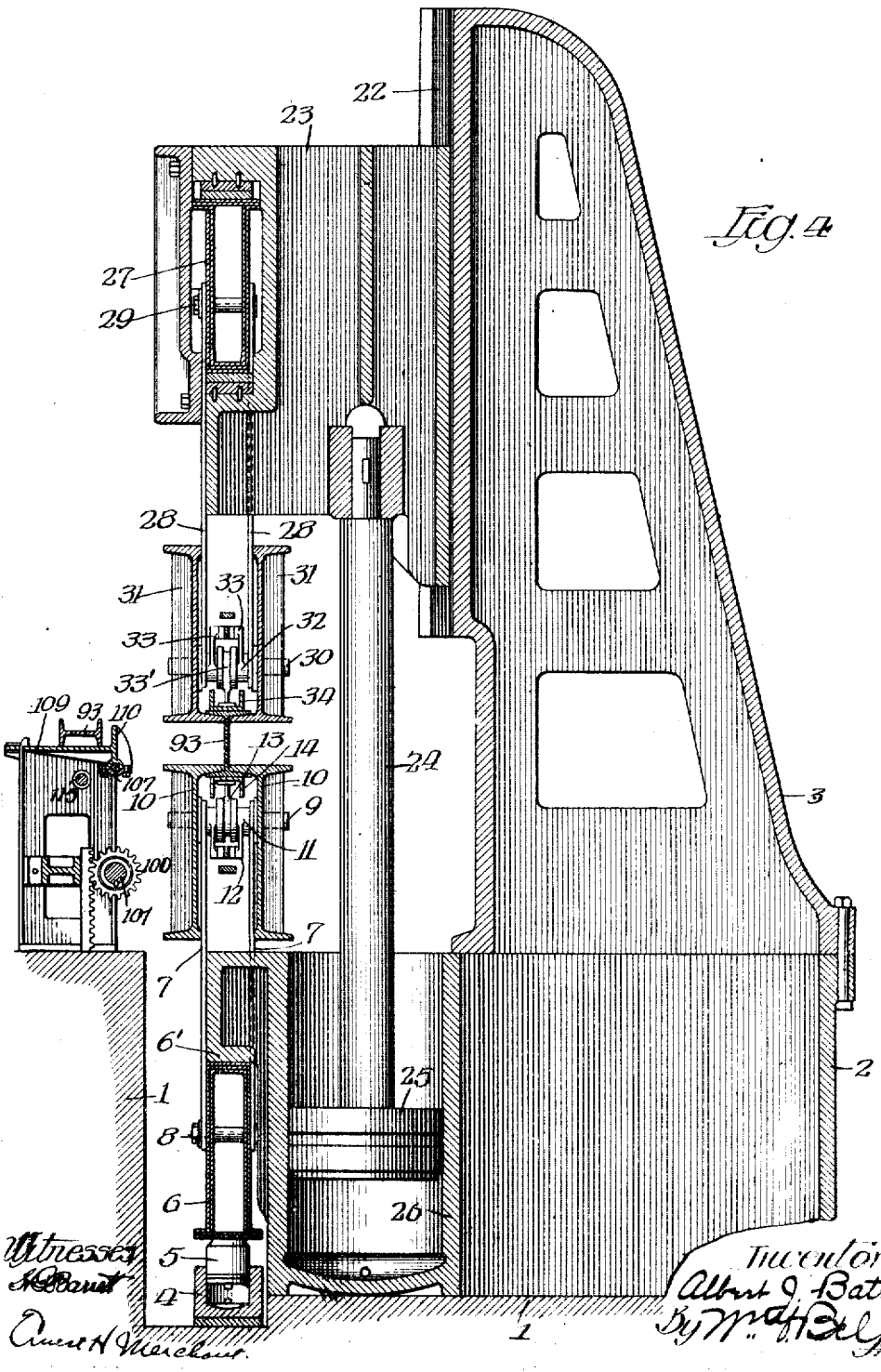
Fig. 4 is an enlarged vertical section on the line 4—4 of Fig. 2.

Referring to the drawing, 1 (Figs. 2 and 4) indicates a foundation, preferably of concrete, and 2 the bases to which a pair of uprights 3 are securely bolted, the bases 2 and the uprights 3 forming the frame of the machine and being preferably constructed of cast metal. A pair of hydraulic cylinders 4 mounted on the foundation 1 are provided with vertically movable plungers 5 supporting a horizontal beam 6 extending longitudinally of the machine. Shoulders 6' (Fig. 4) formed on the bases 2 limit the upward movement of the beam 6 under the actuation of plungers 5. A plurality of pairs of links 7, pivotally connected at 8 to the beam 6, support at their upper ends a plurality of horizontal shafts 9 upon which a pair of oppositely disposed gripping members 10, extending longitudinally of the machine, are slidably mounted. Eccentrics 11 (Fig. 5) are rotatably mounted on each of the shafts 9 between the gripping members 10 and are each provided with an arm 12, whereby the eccentrics 11 may be rotated in the manner presently to be described. Saddles 13 are adapted, during certain phases of the operation, to rest upon the eccentrics 11 and are secured to a channel 14 extending longitudinally of the machine. A plurality of upright members 11' (Fig. 3) adjustably supported at 12' between the gripping members 10 on brackets 13' secured to the foundation 1 serve to support the channel 14 when the plunger 5 is in the lowest position.

Secured at intervals on the outer faces of the gripping members 10 are a plurality of pairs of brackets 15 to which the arms 16 of a plurality of bell-crank levers are pivotally secured, the fulcrums 17 (Fig. 7) of the oppositely disposed pairs of bell-crank levers being connected by links 18 extending through suitable openings in the gripping members 10. The other arms 20 of the bell-crank levers extend through openings 19 in the gripping members 10 and are connected to means presently to be described, whereby the bell-crank levers may be rotated about their fulcrums 17 to move the gripping members 10 toward and from each other. Guide members 18' (Fig. 9) are secured to the links 18 to embrace the channel 14.

Slidably mounted in suitable guideways 22 (Figs. 2 and 4) on the faces of the uprights 3 are a pair of members 23 adapted to be vertically reciprocated by piston rods 24 secured to pistons 25 disposed in the hydraulic cylinders 26 formed in the bases 2. Downward movement of the members 23 is limited by bumpers 23' (Fig. 3) secured to the uprights 3. The bumpers 23' are interchangeable and longer or shorter bumpers may be substituted. A horizontal beam 27, extending longitudinally of the machine, is supported by the members 23. A plurality of pairs of links 28, pivotally connected at 29 to the beam 27, support at their lower extremities a plurality of horizontal shafts 30 upon which a pair of gripping members 31, extending longitudinally of the machine, are slidably mounted. An eccentric 32 (Fig. 5) is mounted on each of the shafts 30 between the gripping members 31, each eccentric 32 being provided with an arm 33, whereby the eccentrics may be rotated, when actuated, in the manner presently to be described. Eccentric sleeves 33' surround the eccentrics 32 and are secured to a channel 34 extending longitudinally of the machine.

Secured to the gripping members 31 at intervals thereon are a plurality of pairs of brackets 35 to which the arms 36 of a plurality of bell-crank levers are pivotally secured. The fulcrums 37 (Fig. 6) of the bell-crank levers are connected by links 38 extending through suitable openings in the gripping members 31. The other arms 40 of the bell-crank levers extend through openings 39 in the gripping members 31 and are connected to means presently to be described, whereby the bell-crank levers may be rotated about their fulcrums 37 to move the gripping members 31 toward and from each other. Guide members 38' (Fig. 9) are secured to the links 38 to embrace the channel 34.

Figure 2:
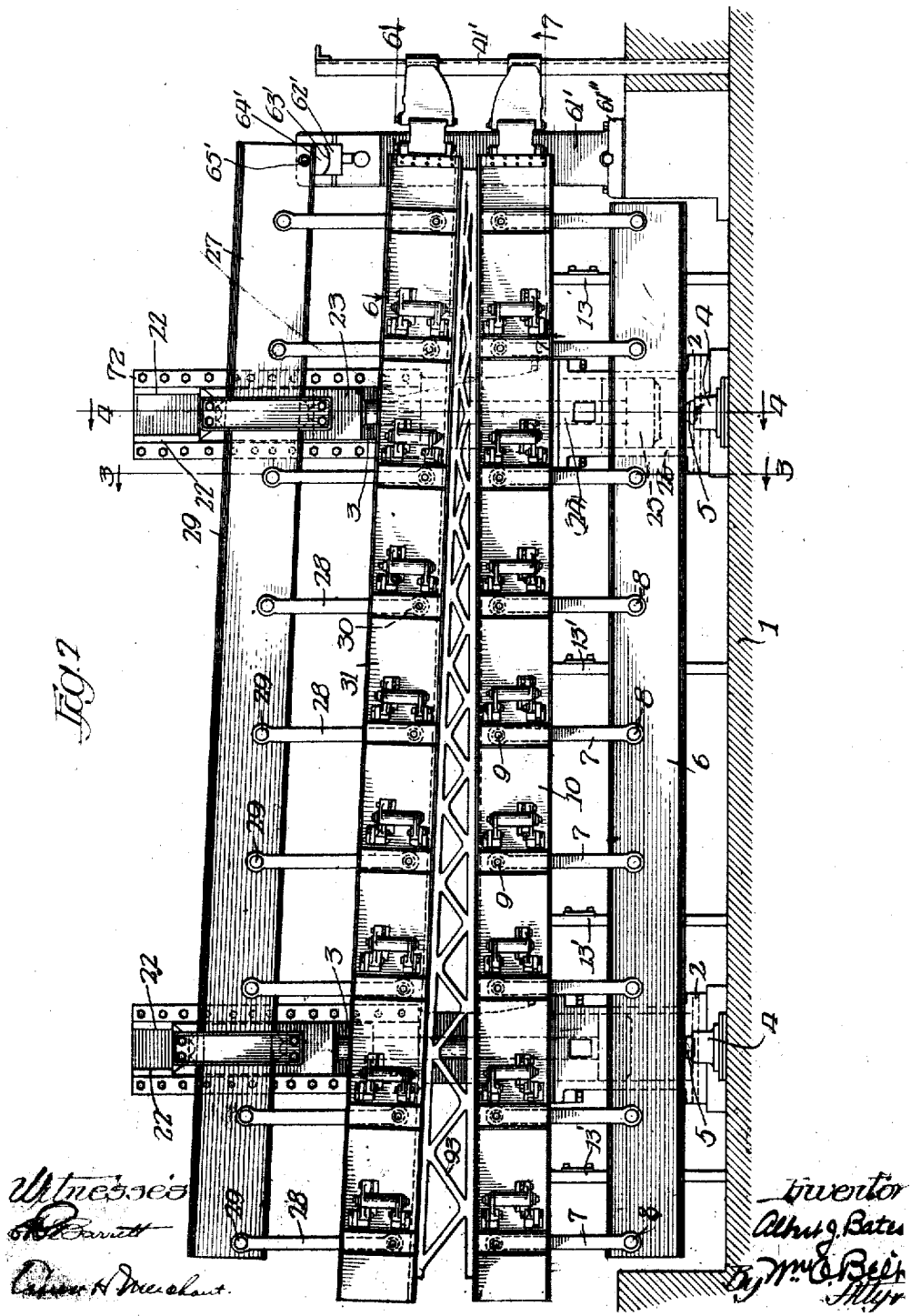
Fig. 2 is a side elevation of the expanding machine.

A pair of hydraulic cylinders 41 and 42 (Figs. 5, 6 and 7) are supported, respectively, on the ends of the gripping members 10 and 31, being connected thereto by means of toggle links 43 and guided during the relative movement of the gripping members 10 and 31 by an upright frame 41' (Fig. 2). The cylinders 41 and 42 are provided with plungers 43 which are connected by plunger rods 44 and swivel links 45 to rods 46 extending longitudinally of the machine and provided at intervals with guide-ways 47 to which the arms 20 and 40 of the bell-crank levers previously described are connected by means of pins 48. As the plungers 43 reciprocate in the cylinders 41 the rods 46 will rotate the bell-crank levers about their fulcrums to move the respective pairs of gripping members 10 and 31 toward and from each other. The toggle links 43' serve to maintain the ends of the gripping members 10 and 31 in proper alinement and overcome the necessity of providing bell-crank levers adjacent the ends thereof.

Pivotally mounted at 49 (Fig. 5) on each of the rods 46 is a lever 50, one end of which threadedly engages a rod 51 disposed through an opening 52 in a bracket 53 secured to the rod 46. A nut 54 threadedly engages the end of the rod 51 and a spring 55 is disposed between the nut 54 and a washer 56 loosely disposed upon the rod 51 adjacent the bracket 53. By varying the position of the nut 54 the tension of the spring 55 may be varied at will. A stop 57, secured to the rod 51, engages the bracket 53 and limits the movement of the rod 51 in one direction. The opposite ends of the levers 50 are connected by means of links 58 to rods 59 extending longitudinally of the machine and connected at intervals to the arms 12 and 33, previously described, of the eccentrics 11 and 32. The links 58 are threaded and form an adjustable connection between the levers 50 and the rods 59. It will be readily understood that the foregoing structure provides means whereby the eccentrics 11 and 32 are rotated when the plungers 43 are actuated. The springs 55 provide for continued movement of the rods 46 to actuate the gripping members 10 and 31 after the channels 14 and 34, which are actuated by the eccentrics 11 and 32, are prevented from further movement in the manner presently to be described.

Pivotally mounted at intervals on the sides of the channels 14 and 34 are strippers 60 (Fig. 13), the function of which will be more fully explained hereafter. The flat portions 61 of the strippers 60 are adapted to engage the free edges of the channels 14 and 34 and when so engaged the flanges 62 of the strippers 60 project beyond the faces of the channels 14 and 34.

The strippers 60 embracing the channel 14 are normally held with the flat portions 61 thereof in engagement with the free edges of the channel by springs 63 (Figs. 11 and 12) disposed about bolts 64 secured to and depending from the channel 14. Links 65 connect the strippers 60 to arms 66 secured to the links 7, the links 65 being slotted at 67 to receive pins 68 on the arms 66. After the channel 14 engages the upright members 11' (Figs. 3 and 10) the continued downward movement of the links 7 moves the strippers 60 against the action of the springs 63 to withdraw the flanges 62 to a position in which their upper edges are in the plane of the face of the channel 14. The strippers 60 on the channel 34 are normally held by gravity with the flat portions 61 thereof in engagement with the free edges of the channel.

An upright member 61' (Figs. 1 and 2) is slidably mounted on a support 61" to the foundation 1 adjacent one end of the machine and is provided with a support 62' projecting beneath the beam 27 and provided with a rounded seat 63' to receive a similarly rounded shoe 64' on the beam 27. A bolt 65' is adapted to be disposed through suitable openings in the upright member 61' and the beam 27 when the shoe 64' is resting in the seat 63' to provide a pivot about which the beam 27 swings when lifted by the actuating mechanism. This mechanism is employed when a member is to be expanded to tapered form, as shown in Fig. 2, in which event the hydraulic cylinder 26 more remote from the member 61' is employed alone to produce the desired movement of the gripping members 31. If the sides of the expanded member are to be parallel the bolt 65' is withdrawn and the upright 61' is moved laterally by means of a screw 66' to remove the member 61' and the support 62' from the path of the gripping members 31 and the beam 27 so that both ends of the beam 27 may move freely.

The actuating mechanism for the hydraulic cylinders 4, 26, 41 and 42 comprise a weighted pressure tank or accumulator 69 adapted to contain a supply of liquid under pressure and a pump 70, driven preferably by a motor 71, to withdraw liquid from the sump 72 and force it into the pressure tank 69. A pipe 73 connects the pump 70 to the pressure tank and a pipe 74 connects the sump 72 to the pump 70. A pipe 75 connects the pressure tank 69 to the valve mechanism 76 which is controlled by levers 77 (Fig. 3) to admit liquid under pressure to the hydraulic cylinders 4 and 26 to release the liquid therefrom after the desired result has been accomplished. A pipe 77' connects the valve mechanism 76 to the sump 72 so that the liquid is returned thereto for reuse when released from the cylinders. The valve 78 (Fig. 1) is connected by pipes 79 and 80 to the hydraulic cylinders 26. Auxiliary valves 81 are disposed in the pipes 80 and the operating levers 82 thereof are provided with rods 83 slidably engaging abutments 84 on the members 23. Adjustable collars 85 on the rods 83 provide means whereby the rods 83 may be caused to actuate the valves 81 in either direction when the members 23 have moved a predetermined distance. By-passes 80' (Figs. 1 and 3) about the valves 81 including check valves 81' allow the liquid to return from the hydraulic cylinders 26 after the valves 81 have been automatically closed.

The valve 86 is connected by pipes 87 and 88 to the hydraulic cylinders 4. The valve 89 is connected by the pipes 90 and 91 to the hydraulic cylinders 41 and 42, the valve 89 being a three-way valve in order that the plungers 43 in the hydraulic cylinders 41 and 42 may be actuated in either direction. Flexible connections 92 are provided between the pipes 91 and the hydraulic cylinders 41 and 42 for the reason that the hydraulic cylinders 41 and 42 are necessarily moved relatively to the pipes 91 during the operation of the machine.

The operation of the portion of the machine heretofore described will be readily understood by reference to Figs. 14 to 18 of the drawing. To place the machine in readiness to receive a member 93 to be expanded the motor 71 is started and when sufficient pressure has accumulated in the accumulator 69 the valve 78 is actuated to admit liquid to the hydraulic cylinders 26 to raise the members 23 carrying the gripping members 31. The valve 89 is actuated to admit liquid to the hydraulic cylinders 41 and 42 to move the pistons 43 to the left, viewing Fig. 5, thereby separating the respective pairs of gripping members 10 and 31 and simultaneously lowering and raising the respective channels 14 and 34. By actuating the valve 86 liquid is released from the hydraulic cylinders 4, allowing the gripping members 10 to descend to their lowest portion. The parts being then in the position indicated in Fig. 14 with the channels 14 supported upon the upright members 11' and the upper faces of the gripping members 10 disposed in the plane of the upper faces of the channel 14, a member 93, which has previously been sheared and heated in accordance with the method described in my above-mentioned patent, is disposed on the channel 14 in any suitable manner but preferably by mechanism hereafter to be described. It will be noted that the edges of the flanges 62 on the strippers 60 are at this phase of the operation disposed as indicated in Fig. 10 so that the member 93 may be moved laterally onto the channel 14 without interfering therewith.

A valve 86 is then actuated to admit liquid to the hydraulic cylinders 4 which raise the gripping members 10 to the position indicated in Fig. 15 and incidentally release the strippers 60 on the channel 14 so that the flanges 62 on the strippers 60 may be moved by the springs 63 to the position indicated in Fig. 11 unless the member 93 is warped, is indicated in Fig. 10. The valve 78 is then actuated to release the liquid from the hydraulic cylinders 26, allowing the gripping members 31 to descend to the position indicated in Fig. 16. The valve 89 is then actuated to cause the plungers 43 in the hydraulic cylinders 41 and 42 to move to the right, viewing Fig. 5, whereby, through the actuation of the rods 46 and 59 and the rotation of the eccentrics 11 and 32, the channels 14 and 34 are moved into engagement with the flanges of the member 93. The channels 14 and 34 and their actuating mechanism constitute auxiliary clamping means to firmly hold the member 93 during the expanding operation. Simultaneously the gripping members 10 and 31 are moved through the continued actuation of the rods 46 and the consequent rotation of the bell-crank levers, to the position indicated in Fig. 17, gripping the member 93 securely and incidentally straightening it, if warped, as indicated in Fig. 11. The flanges 62 on the strippers 60 secured to the channels 14 and 34 will move to the position indicated in Fig. 11 when the member 93 has been straightened. The valve 78 is then actuated to admit liquid to the hydraulic cylinders 26, causing the members 23 to move upwardly, carrying the gripping members 31 to the position indicated in Fig. 18 and expanding the member 93. When the desired expansion has been accomplished the supply of liquid under pressure to the hydraulic cylinders 26 will be automatically cut off by engagement of stops 84 on the members 23 with the upper adjustable collars 85 on the rods 83. The operator at this moment quickly throws the valve 78 to neutral position and simultaneously reverses valve 89 to cause the pistons 43 in the cylinders 41 and 42 to move to the left, viewing Fig. 5, to separate the gripping members 10 and 31 and release the expanded member 93. The flanges 62 of the strippers 60 will prevent sidewise movement of the member 93 during the separation of the pairs of gripping members 10 and 31. The valve 86 is then actuated to release the pressure from the hydraulic cylinders 4 and allow the gripping members 10 to descend to resting position on the bases 2 with the channel 14 resting on the members 11', bringing the upper faces of the gripping members 10 and the channel 14 to a common plane, after which the expanded member 93 may be removed from the machine preferably in an endwise direction.

Figure 1:
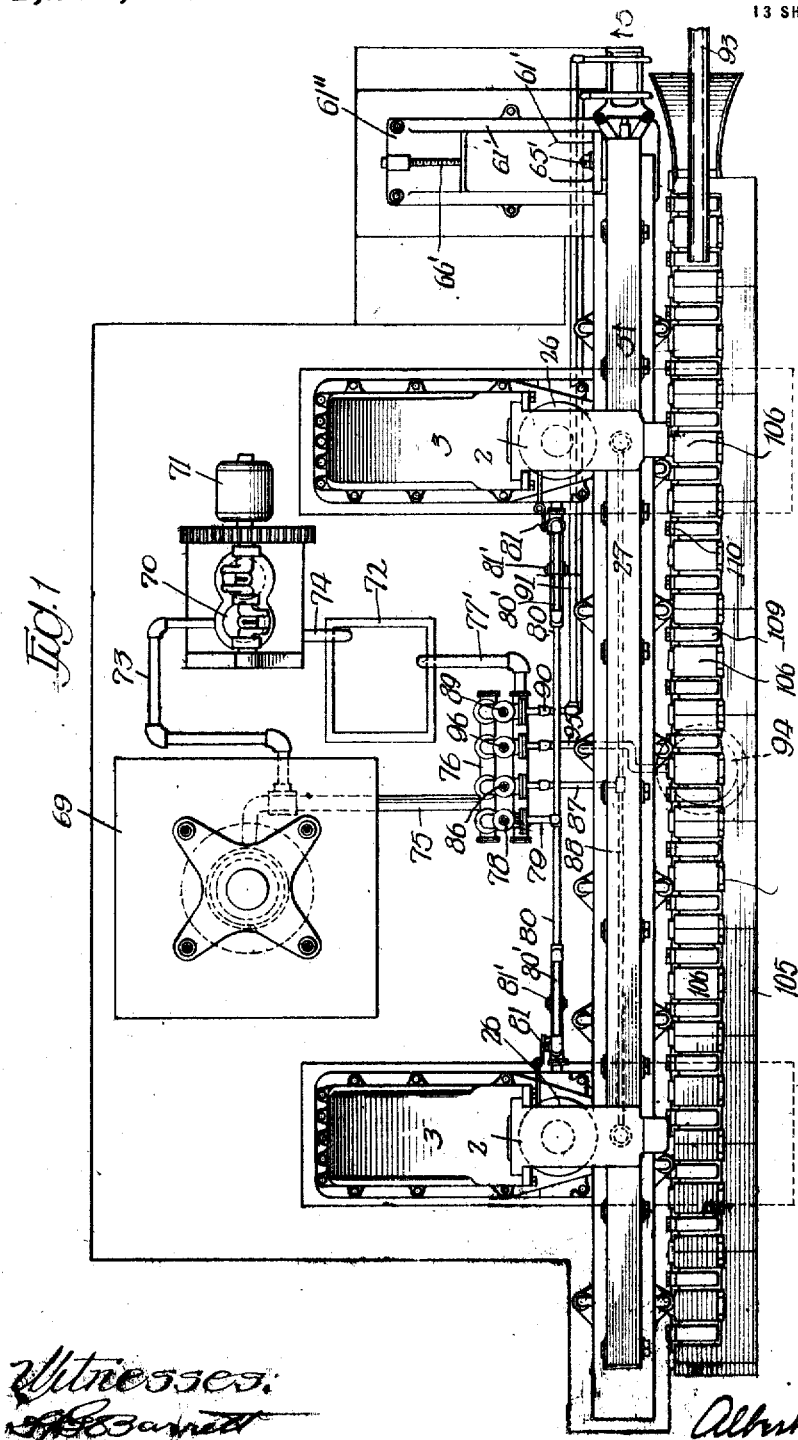
Figure 1 is a top plan view of the expanding machine, together with the mechanism for delivering members to be expanded thereto and the hydraulic actuating means.

In Figs. 19 and 24, inclusive, I have illustrated mechanism for delivering members to be expanded to the expanding machine. This mechanism, as shown in Fig. 1, is disposed in front of and parallel to the expanding machine and preferably receives the members 93 endwise directly from a heating furnace (not shown).

A plurality of uprights 93' (Fig. 19) are mounted on the foundation 1 and form a support for the mechanism. A hydraulic cylinder 94 is mounted within a suitable recess in the foundation 1 and is connected by a pipe 95 (Fig. 1) to a valve 96, forming a part of the valve mechanism 76, whereby liquid from the pressure tank 69 may be admitted to the cylinder 94 and discharged therefrom to the sump 72.

A plunger 97 is disposed in the hydraulic cylinder 94 and provided with a weight 98 which serves to return the parts to normal position when the liquid is released from the hydraulic cylinder 94. A rack 99 (Figs. 19 and 21) is secured to the upper end of the weight 98 and meshes with a pinion 100 keyed to a shaft 101 journaled in suitable bearings in the uprights 93'. Gears 102 on the shaft 101 mesh with pinions 103 secured to the counter-shafts 104, journaled in suitable bearings in the uprights 93', whereby the shafts 104 are rotated in unison when the rack 99 is actuated in either direction by the pressure of the liquid in the hydraulic cylinder 94 or by the weight 98.

Supported on the uprights 93' is a table 105 (Fig. 1) having a plurality of spaced forwardly-extending portions 106. A shaft 107 is rotatably mounted in suitable bearings in uprights 93'. A plurality of members 108 are secured to the shaft 107 and are normally disposed as indicated in Fig. 21 with their longer arms 109 disposed in a horizontal plane and their shorter arms 110 extending in a vertical direction.

Secured to the shaft 107 at either end are mutilated pinions 111 having teeth 112 adapted to engage the teeth 113 of mutilated gears 114 secured to the respective shafts 104. When the shafts 104 are rotated as previously described, the shaft 111 will be rotated sufficiently to turn the members 108 through an angle of ninety degrees on to the position indicated in Figs. 22 to 24. Arms 111' and 114' on the pinions 111 and gears 114, respectively, insure the meshing of teeth 112 and 113.

A shaft 115 is rotatably mounted in suitable bearings in the uprights 93' and is provided with a plurality of gears 116 engaging rack bars or pusher rods 117 slidably mounted at intervals on the table 105 in suitable guideways 118. Mutilated pinions 119 are secured to the shaft 115 and are provided with teeth 120 adapted to engage the teeth 121 of mutilated gears 122 secured to the respective shafts 104. Arms 119' and 122' on the pinions 119 and gears 122 insure the meshing of the teeth 120 and 121. Members 124' secured to the pinions 119 limit the angular movement of the shaft 115 by engagement with the peripheries of the gears 122. The mutilated gears 112 and 122 are so timed with respect to each other that the latter do not come into operation until the former have completed their effective movement to actuate the members 108 as above described. When the effective movement of the mutilated gears 122 commences the shaft 115 will be rotated and consequently the pusher rods 117 will be advanced as indicated in Fig. 22.

The mode of operation of the delivery mechanism will be readily understood from the following brief description thereof. Members 93 to be expanded are drawn endwise from a suitable heating furnace onto forwardly projecting portions 106 of the table 105, the member 93 resting on the edges of its flanges in which position it passes through the furnace. The parts being in the position indicated in Fig. 21, the valve 96 is actuated to admit liquid to the cylinder 94, thus forcing the rack 99 upwardly and rotating the shafts 101 and 104. During the first portion of the rotation of shafts 104 the shaft 107 will be actuated to turn the members 108 through an angle of ninety degrees or to the position indicated in Fig. 22, so that the member 93 stands upright on one of its sides or in the position in which it is to be treated in the expanding machine. During the second portion of the rotation of the shafts 104 the pusher rods will be actuated to force the member 93 into proper position on the channel 14 (Fig. 14), after which the liquid may be released from the hydraulic cylinder 94 and the weight 98 will return the parts to normal position in readiness to receive another member 93.

From the foregoing description it will be apparent that I have perfected a machine adapted for use in expanding metallic members in accordance with the method described in my above-mentioned patent and that all of the operations are readily controllable and are performed with a minimum of effort on the part of the operator and hence with relatively great rapidity.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a machine for expanding flanged metallic members, the combination of oppositely disposed means to engage the inner faces of the flanges of a member to be expanded on both sides and throughout substantially the entire length therof, auxiliary clamping means cooperating with the first mentioned means and means for separating the gripping means to expand said member.

2. In a machine for expanding flanged metallic members, the combination of two pairs of oppositely disposed gripping elements having oppositely directed flanges to engage the inner faces of the flanges of the member to be expanded on both sides and throughout substantially the entire length thereof, means to move said gripping elements to flange engaging position, and means for separating said pairs of gripping elements to expand the member gripped thereby.

3. In a machine for expanding flanged metallic members, the combination of two pairs of oppositely disposed gripping elements having oppositely directed flanges to engage the inner faces of the flanges of a member to be expanded on both sides thereof, means for moving the gripping elements of said pairs toward each other, and means for moving said pairs of gripping elements relatively to each other to expand the member gripped thereby.

4. In a machine for expanding flanged metallic members, the combination of two pairs of oppositely disposed gripping elements having oppositely directed flanges to engage the inner faces of the flanges of a member to be expanded on both sides thereof, a plurality of connecting means between the elements of each of said pairs, and means for simultaneously actuating said connecting means to move said elements toward and from each other.

5. In a machine for expanding flanged metallic members, the combination of two pairs of oppositely disposed gripping elements having oppositely directed flanges to engage the inner faces of the flanges of a member to be expanded on both sides thereof, a plurality of connecting means between the elements of each of said pairs, means for simultaneously actuating said connecting means to move said elements toward and from each other, and means for moving said pairs of elements relatively to each other.

6. In a machine for expanding metallic members, the combination of two pairs of oppositely disposed gripping elements, auxiliary clamping means coöperating with each pair of said elements, and means for simultaneously moving the elements of each of said pairs toward each other and said clamping means to clamping position.

7. In a machine for expanding metallic members, the combination of two pairs of oppositely disposed gripping elements, auxiliary clamping means coöperating with each pair of said elements, means for simultaneously moving the elements of each of said pairs toward each other and said clamping means to clamping position, and means for moving said pairs of elements relatively to each other.

8. In a machine for expanding metallic members, the combination of two pairs of oppositely disposed gripping elements, connecting means between the elements of each of said pairs, auxiliary clamping means coöperating with each pair of gripping elements, and means for simultaneously actuating said connecting and clamping means to move the elements of each pair toward each other and to move said clamping means to clamping position.

9. In a machine for expanding metallic members, the combination of two pairs of oppositely disposed gripping elements, connecting means between the elements of each of said pairs, auxiliary clamping means coöperating with each pair of gripping elements, means for simultaneously actuating said connecting and clamping means to move the elements of each pair toward each other and to move said clamping means to clamping position, and means for moving said pairs of elements relatively to each other.

10. In a machine for expanding metallic members, the combination of two pairs of oppositely disposed gripping elements, means for moving the elements of each of said pairs toward each other, means for moving said pairs of gripping elements relatively to each other, auxiliary clamping means coöperating with each of said pairs of gripping elements, and means for moving said clamping means to clamping position simultaneously with the movement of the elements of said pairs toward each other.

11. In a machine for expanding metallic members, the combination of two pairs of oppositely disposed gripping elements, means for moving the elements of each of said pairs toward each other, means for moving said pairs of gripping elements relatively toward and from each other, auxiliary clamping means associated with each of said pairs of gripping elements, means for moving said clamping means to clamping position simultaneously with the movement of the elements of said pairs toward each other, and fixed means adapted to support one of said auxiliary clamping means when the pair of gripping elements corresponding thereto is moved away from the complementary pair of gripping elements.

12. In a machine for expanding metallic members, the combination of means to grip the opposite edges of a member to be expanded throughout substantially the entire length thereof, and means for separating the gripping means to expand said member, and pivotal means for restraining one end of said gripping means. whereby a tapered trussed structure is produced.

13. In a machine for expanding metallic members. the combination of two pairs of oppositely disposed gripping elements, means for actuating said gripping elements to grip the edge of the member to be expanded, means for pivotally supporting one end of one of said pairs of gripping elements, and means for swinging said pair of gripping elements on its pivotal support, whereby a tapered trussed structure is produced.

14. In a machine for expanding metallic members, the combination of two pairs of oppositely disposed gripping elements, means for actuating said gripping elements to grip the edges of the member to be expanded, auxiliary clamping means associated with said pairs of gripping elements, means for moving said clamping means to clamping position simultaneously with the movement of said gripping elements to gripping position, means for pivotally supporting one end of one of said pairs of gripping elements, and means for swinging said pair of gripping elements on its pivotal support whereby a tapered trussed structure is produced.

15. In a machine for expanding metallic members, the combination of two pairs of oppositely disposed gripping elements, a plurality of connecting means between the elements of each of said pairs, means for actuating said connecting means to cause said gripping elements to grip the edges of the member to be expanded, auxiliary clamping means associated with said pairs of gripping elements, means for moving said clamping means to clamping position simultaneously with the movement of said gripping elements to gripping position, means for pivotally supporting one end of one of said pairs of gripping elements, and means for swinging said pair of gripping elements on its pivotal support, whereby a tapered trussed structure is produced.

16. In a machine for expanding flanged metallic members, the combination of oppositely disposed means to engage the inner faces of the flanges of a member to be expanded, throughout substantially the entire length thereof, auxiliary clamping means cooperating with the first mentioned means, means for applying force to one of the gripping means to move it relatively to the other, and means for automatically cutting off the application of force to said gripping means when the desired expansion of said member has been accomplished.

17. In a machine for expanding flanged metallic members, the combination of two pairs of oppositely disposed gripping elements having oppositely directed flanges to engage the inner faces of the flanges of a member to be expanded, means for moving said gripping elements to flange-engaging position, means for applying force to one of said pairs of gripping elements to move it relatively to the other, and means for automatically cutting off the application of force to said gripping means when the desired expansion of said member has been accomplished.

18. In a machine for expanding metallic members, the combination of two pairs of oppositely disposed gripping elements, means for actuating said gripping elements to grip the edges of the member to be expanded, auxiliary clamping means cooperating with each of said pairs of gripping elements, means for moving said clamping means to clamping position simultaneously with the movement of said gripping elements to gripping position, means for applying force to one of said pairs of gripping elements to move it relatively to the other, and means for automatically cutting off said force when the desired expansion of said member has been accomplished.

19. In a machine for expanding metallic members, the combination of means to grip the opposite edges of a member to be expanded, means for separating said gripping means to expand said member, and power actuated means for automatically delivering members to be expanded to said gripping means.

20. In a machine for expanding metallic members, the combination of two pairs of oppositely disposed gripping elements, means for actuating said gripping elements to grip the edges of a member to be expanded, means for separating said pairs of gripping elements to expand the member gripped thereby, and power actuated means for automatically delivering members to be expanded to said gripping means.

21. In a machine for expanding metallic members, the combination of two pairs of oppositely disposed gripping elements, means for actuating said gripping elements to grip the edges of a member to be expanded, auxiliary clamping means cooperating with each pair of gripping elements, means for moving said clamping means to clamping position simultaneously with the movement of said gripping elements to gripping position, means for separating said pairs of gripping elements, and means for delivering members to be expanded to said gripping elements.

22. In a machine for expanding flanged metallic members, the combination of oppositely disposed means to engage the inner faces of the flanges of a member to be expanded throughout substantially the entire length thereof, auxiliary means cooperating with said first-mentioned means and engaging the outer faces of said flanges, and hydraulic means for separating said gripping means to expand said member.

23. In a machine for expanding flanged metallic members, the combination of two pairs of oppositely disposed gripping elements having oppositely directed flanges to engage the inner faces of the flanges of a member to be expanded, means for actuating said gripping elements, and hydraulic means for separating said pairs of gripping elements to expand the member gripped thereby.

24. In a machine for expanding metallic members, the combination of two pairs of oppositely disposed gripping elements, means for actuating said gripping elements to grip the edges of a member to be expanded, hydraulic means for separating said pairs of gripping elements to expand the member gripped thereby, and means for controlling said hydraulic means at will.

25. In a machine for expanding metallic members, the combination of two pairs of oppositely disposed gripping elements, means for actuating said gripping elements to grip the edges of a member to be expanded, auxiliary clamping means associated with each of said pairs of gripping elements, means for actuating said clamping means, and hydraulic means for simultaneously operating the actuating means for said gripping elements and clamping means.

26. In a machine for expanding metallic members, the combination of two pairs of oppositely disposed gripping elements, means for actuating said gripping elements to grip the edges of a member to be expanded, auxiliary clamping means associated with each pair of said gripping elements, means for actuating said clamping means, hydraulic means for simultaneously operating the actuating means for said gripping elements and clamping means, and hydraulic means for separating said pairs of gripping elements to expand said member.

27. In a machine for expanding metallic members, the combination of two pairs of oppositely disposed gripping elements, means for actuating said gripping elements to grip the edges of a member to be expanded, auxiliary clamping means associated with each of said pairs of gripping elements, means for actuating said clamping means, means for simultaneously operating the actuating means for said gripping elements and clamping means, and a compensating connection between said actuating means for said gripping elements and clamping means, whereby the movement of the former may be continued after the latter are prevented from further movement.

28. In a machine for expanding metallic members, the combination of two pairs of oppositely disposed gripping elements, means for actuating said gripping elements to grip the edges of a member to be expanded, auxiliary clamping means associated with each of said pairs of gripping elements, means for actuating said clamping means, hydraulic means for simultaneously operating the actuating means for said gripping elements and clamping means, and a compensating connection between said actuating means for said gripping elements and clamping means, whereby the movement of the former may be continued after the latter are prevented from further movement.

29. In a machine for expanding metallic members, the combination of two pairs of oppositely disposed gripping elements, means for actuating said gripping elements to grip the edges of a member to be expanded, auxiliary clamping means associated with each of said pairs of gripping elements, means for actuating said clamping means, hydraulic means for simultaneously operating the actuating means for said gripping elements and clamping means, a compensating connection between said actuating means for said gripping elements and clamping means, whereby the movement of the former may be continued after the latter are prevented from further movement, and hydraulic means for separating said pairs of gripping elements to expand the member gripped thereby.

30. In a machine for expanding metallic members, the combination of a frame, a pair of relatively movable gripping elements supported adjacent the base of said frame, slidable supports on said frame, a pair of relatively movable gripping elements carried by said supports above said first-mentioned gripping elements, auxiliary clamping means coöperating with each of said pairs of gripping elements, means for moving the gripping elements of each pair toward each other and said auxiliary clamping means toward said gripping elements to grip a member disposed therebetween, and means for actuating said slidable supports to separate said pairs of gripping elements.

31. In a machine for expanding metallic members, the combination of a frame, a pair of relatively movable gripping elements supported adjacent the base of said frame, means for vertically reciprocating said pair of gripping elements, slidable supports on said frame, a pair of relatively movable gripping elements carried by said supports, above said first-mentioned gripping elements, means for moving the gripping elements of each pair toward each other to grip a member disposed therebetween, and means for vertically reciprocating said supports to separate said pairs of gripping elements.

32. In a machine for expanding metallic members, the combination of a frame, a pair of relatively movable gripping elements supported adjacent the base of said frame, means for vertically reciprocating said pair of gripping elements, slidable supports on said frame, a pair of relatively movable gripping elements carried by said supports above said first-mentioned gripping elements, means for moving the gripping elements of each pair toward each other to grip a member disposed therebetween, means for vertically reciprocating said supports to separate said pairs of gripping elements, and means for limiting the upward movement of said first-mentioned gripping elements.

33. In a machine for expanding metallic members, the combination of a frame, a pair of relatively movable gripping elements supported adjacent the base of said frame, means for vertically reciprocating said pair of gripping elements, slidable supports on said frame, a pair of relatively movable gripping elements carried by said supports above said first-mentioned gripping elements, means for moving the gripping elements of each pair toward each other to grip a member disposed therebetween, auxiliary clamping means associated with each of said pairs of gripping elements, means for moving said clamping means to clamping position simultaneously with the movement of said gripping elements to gripping position, and means for vertically moving said supports to separate said pairs of gripping elements.

34. In a machine for expanding metallic members, the combination of a frame, a pair of relatively movable gripping elements supported adjacent the base of said frame, means for vertically reciprocating said pair of gripping elements, means for limiting the upward movement thereof, slidable supports on said frame, a pair of relatively movable gripping elements carried by said supports above said first-mentioned gripping elements, means for moving the gripping elements of each of said pairs toward each other to grip a member disposed therebetween, auxiliary clamping means associated with each of said pairs of gripping elements, means for moving said clamping means to clamping position simultaneously with the movement of said gripping means to gripping position, a fixed support for the clamping means associated with said first-mentioned gripping elements adapted to support said clamping means when said first-mentioned gripping elements are disposed in their lowest position, and means for vertically moving said supports to separate said pairs of gripping elements.

35. In a machine for expanding metallic members, the combination of a frame, hydraulic cylinders adjacent the base of said frame, a beam supported thereon, a plurality of links pivotally connected to said beam, a plurality of horizontal shafts supported by said links, a pair of gripping elements slidably supported on said shafts, bell-crank levers mounted on said gripping elements, spacing bars connecting the fulcrums of said bell-crank levers, a plurality of eccentrics on said shafts and provided with operating arms, saddles adapted to rest on said eccentrics, a channel secured to said saddles, slidable members supported by said frame, a beam carried by said slidable members, a plurality of links depending therefrom, horizontal shafts supported by said links, a pair of gripping elements slidably supported on said shafts, bell-crank levers mounted on said gripping elements, spacing bars connecting the fulcrums of said bell-crank levers, a plurality of eccentrics on said shafts and provided with operating arms, sleeves on said eccentrics, a channel secured to said sleeves, separate rods connecting the arms of said bell-crank levers and of said eccentrics, means for actuating said rods, and means for vertically moving said slidable members, whereby said pairs of gripping elements are separated to expand a member gripped thereby.

36. In a machine for expanding metallic members, the combination of a frame, hydraulic cylinders adjacent the base of said frame, a beam supported thereon, a plurality of links pivotally connected to said beam, a plurality of horizontal shafts supported by said links, a pair of gripping elements slidably supported on said shafts, bell-crank levers mounted on said gripping elements, spacing bars connecting the fulcrums of said bell-crank levers, a plurality of eccentrics on said shafts and provided with operating arms, saddles adapted to rest on said eccentrics, a channel secured to said saddles, slidable members supported by said frame, a beam carried by said slidable members, a plurality of links depending therefrom, horizontal shafts supported by said links, a pair of gripping elements slidably supported on said shafts, bell-crank levers mounted on said gripping elements, spacing bars connecting the fulcrums of said bell-crank levers, a plurality of eccentrics on said shafts and provided with operating arms, sleeves on said eccentrics, a channel secured to said sleeves, separate rods connecting the arms of said bell-crank levers and of said eccentrics, a compensating connection between said rods, means for actuating one of said rods, whereby the other is also actuated, and means for vertically moving said slidable members whereby said pairs of gripping elements are separated to expand a member gripped thereby.

37. In a machine for expanding flanged metallic members, the combination of oppositely disposed means to engage the inner faces of the flanges of a member to be expanded, throughout substantially the entire length thereof, means for applying force to one of the gripping means to move it relatively to the other, and means for cutting off the application of force to said gripping means when the desired expansion of said member has been accomplished.

38. In a machine for expanding flanged metallic members, the combination of two pairs of oppositely disposed gripping elements having oppositely directed flanges to engage the inner faces of the flanges of a member to be expanded, means for actuating said gripping elements, means for applying force to one of said pairs of gripping elements to move it relatively to the other, and means for cutting off the application of force to said gripping means when the desired expansion of said member has been accomplished.

39. In a machine for expanding metallic members, the combination of two pairs of oppositely disposed gripping elements, means for actuating said gripping elements to grip the edges of the member to be expanded, auxiliary clamping means coöperating with each of said pairs of gripping elements, means for moving said clamping means to clamping position simultaneously with the movement of said gripping elements to gripping position, means for applying force to one of said pairs of gripping elements to move it relatively to the other, and means for cutting off said force when the desired expansion of said member has been accomplished.

40. In a machine for expanding metallic members, the combination of two pairs of oppositely disposed gripping elements, means for actuating said gripping elements to grip the edges of a member to be expanded, auxiliary clamping means coöperating with each of said pairs of gripping elements, means for actuating said clamping means, and hydraulic means for operating the actuating means for said gripping elements and clamping means.

41. In a machine for expanding metallic members, the combination of two pairs of oppositely disposed gripping elements, means for actuating said gripping elements to grip the edges of a member to be expanded, auxiliary clamping means associated with each pair of said gripping elements, means for actuating said clamping means, hydraulic means for operating the actuating means for said gripping elements and clamping means, and hydraulic means for separating said pairs of gripping elements to expand said member.

42. In a machine for expanding metallic members, the combination of two pairs of oppositely disposed gripping elements, means for actuating said gripping elements to grip the edges of a member to be expanded, auxiliary clamping means associated with each of said pairs of gripping elements, means for actuating said clamping means, means for operating the actuating means for said gripping elements and clamping means, and a compensating connection between said actuating means for said gripping elements and clamping means, whereby the movement of the former may be continued after the latter are prevented from further movement.

43. In a machine for expanding metallic members, the combination of two pairs of oppositely disposed gripping elements, means for actuating said gripping elements to grip the edges of a member to be expanded, auxiliary clamping means associated with each of said pairs of gripping elements, means for actuating said clamping means, hydraulic means for operating the actuating means for said gripping elements and clamping means, and a compensating connection between said actuating means for said gripping elements and clamping means, whereby the movement of the former may be continued after the latter are prevented from further movement.

44. In a machine for expanding metallic members, the combination of two pairs of oppositely disposed gripping elements, means for actuating said gripping elements to grip the edges of a member to be expanded, auxiliary clamping means associated with each of said pairs of gripping elements, means for actuating said clamping means, hydraulic means for operating the actuating means for said gripping elements and clamping means, a compensating connection between said actuating means for said gripping elements and clamping means, whereby the movement of the former may be continued after the latter are prevented from further movement, and hydraulic means for separating said pairs of gripping elements to expand the member gripped thereby.

45. In a machine for expanding metallic members, means for delivering members to be expanded thereto including a table, means on said table to receive a member, means for rotating said member through an angle of ninety degrees, and means for subsequently forcing said member from said table onto said expanding machine.

46. In a machine for expanding metallic members, means for delivering members to be expanded thereto including a table, a plurality of means on said table to receive a member and adapted to be rotated through an angle of ninety degrees, actuating means therefor, and a plurality of plunger rods adapted to be automatically actuated to move said member from said table onto said expanding machine.

47. In a machine for expanding metallic members, means for delivering members to be expanded thereto including a table, a shaft supported by said table, a plurality of elements secured to said shaft to receive a member to be expanded, a plurality of plunger rods slidably mounted on said table, and means for rotating said shaft through an angle of ninety degrees and for subsequently actuating said plunger rods to move said member from said table onto said expanding machine.

ALBERT J. BATES.

Witness:
M. A. KIDDIE.